United States Patent
Sato et al.

(10) Patent No.: US 6,999,684 B2
(45) Date of Patent: Feb. 14, 2006

(54) CAMERA SYSTEM AND CAMERA

(75) Inventors: Shigeki Sato, Tochigi (JP); Toru Kawai, Kanagawa (JP); Masanori Ishikawa, Tokyo (JP); Seiichi Kashiwaba, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 126 days.

(21) Appl. No.: 10/664,339

(22) Filed: Sep. 16, 2003

(65) Prior Publication Data

US 2004/0057712 A1 Mar. 25, 2004

(30) Foreign Application Priority Data

Sep. 19, 2002 (JP) ......................................... 2002-274003

(51) Int. Cl.
*G03B 13/36* (2006.01)

(52) U.S. Cl. ........................................ 398/125; 396/135
(58) Field of Classification Search ................. 396/104, 396/106, 125, 135, 133; 348/345; 250/201.2
See application file for complete search history.

(56) References Cited

U.S. PATENT DOCUMENTS

| | | | | |
|---|---|---|---|---|
| 4,492,750 A | * | 1/1985 | Law et al. ................... | 396/104 |
| 4,561,750 A | * | 12/1985 | Matsumura .................. | 396/104 |
| 5,597,999 A | * | 1/1997 | Kinba et al. .............. | 250/201.7 |
| 5,900,927 A | * | 5/1999 | Hasegawa ................... | 356/3.13 |

FOREIGN PATENT DOCUMENTS

| | | |
|---|---|---|
| JP | 7043605 | 2/1995 |
| JP | 9181954 | 7/1997 |

* cited by examiner

*Primary Examiner*—W. B. Perkey
(74) *Attorney, Agent, or Firm*—Morgan & Finnegan, LLP

(57) ABSTRACT

A camera system which is capable of performing highly accurate focusing in a short time by using two kinds of AF methods, is disclosed. The camera system calculates the target driving amount of the focusing lens based on the result of detection by a first focus detection unit, and performs a first driving control to drive the focusing lens toward a position corresponding to the target driving amount and a second driving control to drive the focusing lens based on the result of detection by the second focus detection unit. When the remaining driving amount to the target driving amount of the focusing lens by the first driving control becomes a predetermined amount, the camera system switches from the first driving control to the second driving control without stopping the focusing lens.

20 Claims, 7 Drawing Sheets

FIG.4

| | DIVISION | FOCAL LENGTH | LENS MOVEMENT AMOUNT PER PARAMETER | LENS IMAGE PLANE MOVEMENT AMOUNT PER PARAMETER | FOCUS SENSITIVITY FS |
|---|---|---|---|---|---|
| WIDE | 0 | 28 | 3.79 | −5.82 | 1.53 |
| | 1 | 30 | 4.08 | −6.61 | 1.62 |
| | 2 | 35 | 4.96 | −9.37 | 1.89 |
| | 3 | 39 | 5.91 | −13.58 | 2.30 |
| | 4 | 44 | 6.91 | −17.28 | 2.50 |
| | 5 | 50 | 7.91 | −22.49 | 2.84 |
| | 6 | 55 | 8.88 | −28.52 | 3.21 |
| | 7 | 62 | 9.82 | −35.37 | 3.60 |
| | 8 | 70 | 10.68 | −43.02 | 4.03 |
| | 9 | 78 | 11.45 | −51.32 | 4.48 |
| | 10 | 88 | 12.13 | −59.53 | 4.94 |
| | 11 | 98 | 12.70 | −68.39 | 5.38 |
| | 12 | 108 | 13.17 | −76.18 | 5.78 |
| | 13 | 118 | 13.54 | −82.93 | 6.12 |
| | 14 | 128 | 13.82 | −88.46 | 6.40 |
| | 15 | 136 | 14.03 | −92.81 | 6.61 |
| | 16 | 143 | 14.18 | −96.11 | 6.78 |
| | 17 | 149 | 14.28 | −98.59 | 6.90 |
| | 18 | 155 | 14.36 | −100.46 | 6.99 |
| | 19 | 160 | 14.43 | −101.87 | 7.06 |
| | 20 | 165 | 14.50 | −102.98 | 7.10 |
| | 21 | 169 | 14.59 | −103.89 | 7.12 |
| | 22 | 173 | 14.64 | −104.69 | 7.15 |
| | 23 | 176 | 14.85 | −105.45 | 7.10 |
| | 24 | 179 | 15.15 | −106.23 | 7.01 |
| | 25 | 182 | 15.24 | −107.08 | 7.03 |
| | 26 | 184 | 15.47 | −108.00 | 6.98 |
| | 27 | 186 | 15.73 | −109.00 | 6.93 |
| | 28 | 188 | 16.01 | −110.05 | 6.87 |
| | 29 | 189 | 16.35 | −111.13 | 6.80 |
| | 30 | 191 | 16.55 | −112.19 | 6.78 |
| | 31 | 196 | 16.80 | −113.17 | 6.74 |
| TELE | 32 | 200 | 17.12 | −114.45 | 6.69 |

CAMERA SYSTEM AND CAMERA

BACKGROUND OF THE INVENTION

1. Field of the Invention

The present invention relates to a camera system, a camera and a lens apparatus attachable to a camera, particularly, having an automatic focusing (AF) function.

2. Description of Related Art

In a single-lens reflex camera to which a lens is interchangeable, a phase difference detection method is frequently used for detecting the focusing state of the image-taking optical system.

According to the phase difference detection method, a luminous flux incident through the lens is separated into two luminous fluxes, and the luminous fluxes are made incident on a pair of two AF sensors, respectively. The AF sensors photoelectrically convert the images formed by the separated luminous fluxes. The relationship between the outputs from the two AF sensors, that is, the distance between the two images differs according to the focusing state, that is, differs between front focus and rear focus, and focusing is performed by moving the focusing lens so that the distance between the images becomes the distance of the in-focus state.

That is, since the relationship between the shift amount between the two images and the image plane movement amount, the so-called defocus amount, depends on the image-taking optical system, the defocus amount is obtained from the shift amount. Then, the movement amount of the focusing lens is obtained from the defocus amount, and the focusing lens is moved, thereby obtaining an in-focus state.

In digital still cameras and digital video cameras in which images are captured in a two-dimensional image pickup device and the image signals thereof are outputted or recorded onto a recording medium, a contrast detection method and a focus detection method called a hill-climbing method are frequently used. In the contrast detection method, since the detectable range of the defocus amount is smaller than that of the phase difference detection method, focus detection is performed, for example, as represented below:

An example of the contrast detection method is a wobbling method. According to this method, image light is captured in the image pickup portion, and the high-frequency components of the outputted image signals are extracted. The highest value of the extracted signals is stored. Then, the focusing lens is moved in a certain direction, and image light is captured and the high-frequency components are extracted in a similar manner. When the highest value of the extracted signals becomes higher than the stored value, determining that the movement direction of the focusing lens is approaching the in-focus position, the current value is re-stored, and the focusing lens is moved in the same direction. When the current highest value is lower than the previous one, determining that the movement direction of the focusing lens is moving away from the in-focus position, the current value is re-stored, and the focusing lens is moved in the direction opposite to the previous direction. In this manner, extraction of the high-frequency components and comparison between the highest values are performed, and the focusing lens is moved so that the image plane is finally brought into the in-focus position.

Another example of focus detection methods using the contrast detection method is a trial-and-error method (including a whole area scanning method). According to this method, the focusing lens is sent to the close end or the infinity end and is moved assuming the sent position as the starting position, and image light is captured in the image pickup portion in a certain distance between the image planes. Then, the captured image light is photoelectrically converted into image signals, the high-frequency components of the image signals are extracted, and the highest value thereof is stored. This operation is repeated until the infinity end is reached when the starting point is the close end and until the close end is reached when the starting point is the infinity end. Then, the highest one of the stored plural highest values, that is, the focus position where the contrast is highest is obtained, and the focusing lens is moved to a position corresponding to the point.

Examples of cameras performing focus detection by the above-described two methods, the phase difference detection method and the contrast detection method, include cameras proposed in Japanese Patent Application Laid-Open No. H7 (1995)-43605 and Japanese Patent Application Laid-Open No. H9 (1997)-181954. Japanese Patent Application Laid-Open No. H9 (1997)-181954 proposes a camera performing hybrid AF by the phase difference detection method and the contrast detection method by use of the outputs of the image pickup device of an electronic still camera.

As another AF method, AF by an active method is known. According to this method, light is projected onto the object, the reflected light is detected by a sensor, and the defocus amount is calculated from the position of the reflected light.

However, when only the AF system using the phase difference detection method is used for digital still cameras, the ratio of the image pickup surface corresponding to one pixel of the AF sensor is high compared to that of film cameras. That is, the detection pixel is coarse and this decreases the accuracy of AF.

To solve this problem, it is necessary to decrease the magnification of the AF optical system and reduce the pixel pitch of the AF sensor. However, doing these is difficult in view of the structure and accuracy and increases the cost.

On the other hand, according to the AF system using only the contrast detection method, since the detectable range of the defocus amount is smaller than that of the phase difference detection method, when the object is largely out of focus, focus detection is difficult and the above-mentioned wobbling and whole area scanning are essential, which increases the time required for focus detection.

Moreover, according to the AF system using both the phase difference detection method and the contrast detection method, since lens driving by the phase difference detection method is performed and after it is confirmed that in-focus state is obtained, AF is performed in the vicinity thereof by the contrast detection method, highly accurate focusing control can be performed. However, compared to the case where only the phase difference detection method is used, additional time is required because of the time required for the lens driving by the contrast method. Moreover, if the lens driving direction is reversed while the lens is being driven by the contrast detection method, the camera operator may experience a sense of discomfort.

Further, according to the active method, there are cases where the defocus amount cannot be correctly calculated for some objects. In such cases, it is necessary to use another method in combination with the active method.

SUMMARY OF THE INVENTION

An object of the present invention is to provide a camera system, a camera and a lens apparatus in which two kinds of AF methods, the phase difference detection method or the active method and the contrast detection method are used, the behavior of the focusing lens is stabilized to thereby shorten the time required for obtaining the in-focus state, and highly accurate focusing is achieved without the camera operator experiencing a sense of discomfort.

To achieve the above-mentioned object, one aspect of the camera system which comprises a lens apparatus which is provided with an image-taking optical system including a focusing lens and a camera to on which the lens apparatus is mounted. The camera system comprises a first focus detection unit and a second focus detection unit which detect a focusing state of the image-taking optical system by methods different from each other, and a controller which controls driving of the focusing lens. The controller calculates a target driving amount of the focusing lens based on a result of the detection by the first focus detection unit, and performs a first driving control to drive the focusing lens toward a position corresponding to the target driving amount and a second driving control to drive the focusing lens based on a result of the detection by the second focus detection unit. The controller switches from the first driving control to the second driving control when a remaining driving amount to the target driving amount of the focusing lens by the first driving control becomes a predetermined amount.

Further, one aspect of the camera of the present invention comprises a first focus detection unit and a second focus detection unit which detect the focusing state of the image-taking optical system including a focusing lens by methods different from each other, and a controller which controls driving of the focusing lens. The controller calculates a target driving amount of the focusing lens based on a result of the detection by the first focus detection unit, and performs a first driving control to drive the focusing lens toward a position corresponding to the target driving amount and a second driving control to drive the focusing lens based on a result of the detection by the second focus detection unit. The controller switches from the first driving control to the second driving control without stopping the focusing lens when a remaining driving amount to the target driving amount of the focusing lens by the first driving control becomes a predetermined amount.

Further, one aspect of the lens apparatus which can be attachable to a camera comprises a first focus detection unit and a second focus detection unit which detect the focusing state of the image-taking optical system by methods different from each other. The lens apparatus comprises the image-taking optical system including a focusing lens, and a controller which controls driving of the focusing lens based on information obtained from the camera. The controller performs a first driving control to drive the focusing lens toward a position corresponding to information on a target driving amount of the focusing lens calculated based on a result of the detection by the first focus detection unit in the camera and a second driving control to drive the focusing lens based on a result of the detection by the second focus detection unit. The controller switches from the first driving control to the second driving control without stopping the focusing lens when a remaining driving amount to the target driving amount of the focusing lens by the first driving control becomes a predetermined amount.

Features of the camera system, the camera and the lens apparatus of the present invention will become clear from the following description of concrete embodiments with reference to the drawings.

BRIEF DESCRIPTION OF THE DRAWINGS

FIG. 4 is a table showing information on the focus sensitivity stored in an interchangeable lens included in the camera system of Embodiment 1;

DETAILED DESCRIPTION OF THE PREFERRED EMBODIMENTS

Hereinafter, preferred embodiments of the invention will be described in detail with reference to the drawings.
(Embodiment 1)

Figure 1:
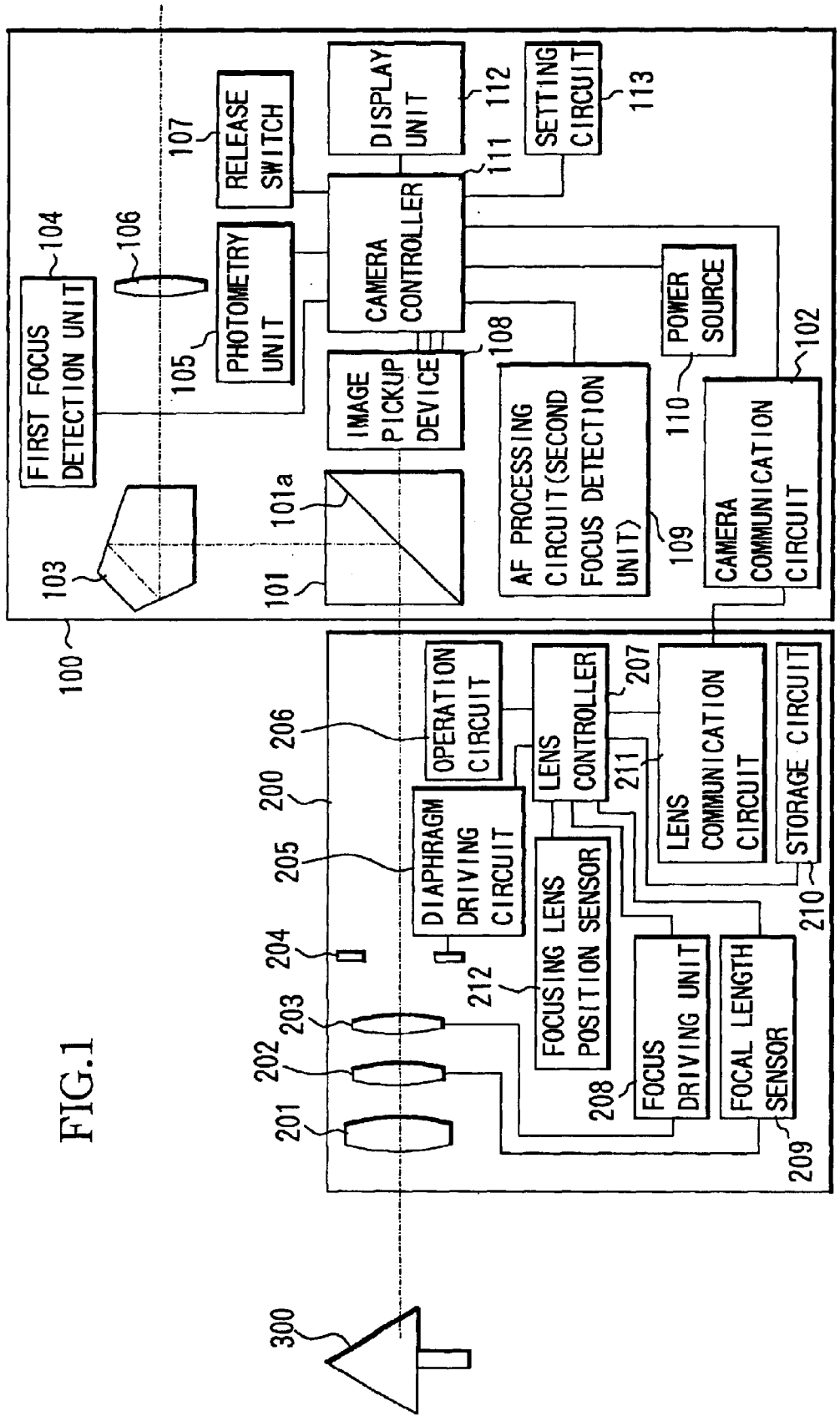
FIG. 1 is a block diagram showing the structure of a camera system according to Embodiment 1 of the present invention.

FIG. 1 shows the structure of a camera system according to Embodiment 1. In FIG. 1, reference numeral 100 represents a digital still camera, and reference numeral 200 represents an interchangeable lens mounted on the camera 100. The digital still camera 100 and the interchangeable lens 200 constitute the camera system of the present embodiment.

A luminous flux from an object 300 enters the camera 100 through a image-taking optical system including a front optical system 201, a zoom lens unit 202 serving as a variable power optical system, a focusing lens unit 203 and a diaphragm (stop) 204 in the interchangeable lens 200. The interchangeable lens 200 of the present embodiment is a zoom lens system having a focal length of 28 to 200 mm and a minimum f-number of 3.5 to 5.6, whose minimum f-number varies according to the focal length, and having a focus driving unit (composed of a motor and its driving circuit) 208 driving the focusing lens unit 203.

Reference numeral 205 represents a diaphragm driving circuit controlling the aperture diameter of the diaphragm 204 based on a signal from a lens controller 207 comprising a CPU or an MPU. Reference numeral 206 represents an operation circuit enabling operations of zooming, focusing and the diaphragm and setting of switching between automatic focusing and manual focusing by a manually operated switch.

The lens controller 207 communicates various kinds of information with a camera controller 111 comprising a CPU or an MPU through a lens communications circuit 211 and a camera communications circuit 102, and performs overall control of the lens 100.

Reference numeral 212 represents a focusing lens position sensor. The focusing lens position sensor 212 has a pulse generator (comprising, for example, a slit plate having a plurality of slits formed in the circumferential direction and rotating as the motor rotates, and a photointerrupter generating a signal by receiving light having passed through the slits) generating a pulse signal as the focus driving unit 208 rotates. The lens controller 207 is capable of detecting the rotation amount of the motor of the focus driving unit 208, that is, the movement amount of the focusing lens unit 203 by counting the pulse signal from the focusing lens position sensor 212, and of detecting the speed of the motor and the focusing lens unit 203 by detecting the period of the pulse signal.

Moreover, the focus driving unit 208 drives the focusing lens unit 203 in the direction of the optical axis in response to the signal from the lens controller 207. The lens controller 207 performs control so that the focusing lens unit 203 is driven to a target position and stopped at the position based on the count value of the pulse signal from the focusing lens position sensor 212.

Reference numeral 209 is a focal length sensor. The movement range of the zoom lens unit 202 is divided into 32 zones, and the focal length sensor 209 detects in which of the 32 zones the zoom lens unit 202 is situated. Specifically, the focal length sensor 209 is structured so that an electric armature (a brush or the like) slides on a gray code pattern (fixed to the interchangeable lens body) corresponding to the 32 divided zones together with the zoom lens unit 202, and a signal in accordance with the position of the electric armature on the gray code pattern is outputted.

Reference numeral 210 represents a storage circuit comprising a ROM or the like in which the identification number (ID) and the focal length information unique to the interchangeable lens 200 of the present embodiment, the focus sensitivity which is the ratio of the image plane movement amount to the movement amount of the focusing lens unit 203, and the like (see FIG. 2) are stored for each divided zone of the focal length. The information stored in the storage circuit 210 can be read out at any time by the lens controller 207.

The luminous flux having entered the camera 100 through the interchangeable lens 200 passes through a prism 101 incorporating a stationary half mirror 101a, and forms an image on the image pickup surface of an image pickup device 108. The image pickup device 108 comprises a photoelectric conversion element such as a CCD or a CMOS sensor. In the prism 101, part of the luminous flux (⅓ in the present embodiment) branches in a vertical direction, and is made incident on a pentaprism 103.

A first focus detection unit 104 is disposed on the optical path (not shown) branching from the optical path headed toward a finder optical system 106 in the pentaprism 103. The first focus detection unit 104 detects the focusing state of the image-taking optical system by the phase difference detection method. In the present embodiment, a luminous flux of F8 is used, this luminous flux is divided into two, and the images formed by the two luminous fluxes are detected by a pair of non-illustrated line sensors. The detection signals from the line sensors are inputted into the camera controller 111.

Light having passed through the pentaprism 103 passes through the finder optical system 106 and is visually recognized as an optical finder image by the camera operator (not shown).

The output signals obtained by photoelectric conversion by the image pickup device 108 are amplified by a non-illustrated image processing circuit, and are inputted into the camera controller 111 as digital image signals. In the camera system of the present embodiment, a moving image or a still image is formed by use of the image signals. The moving image or the still image is recorded onto a non-illustrated recording medium such as a semiconductor memory, a magnetic disk or an optical disk, or is displayed on a display unit 112 such as a liquid crystal display panel.

The digitized image signals are also inputted into an AF processing circuit 109 as a second focus detection unit in addition to being transmitted to the camera controller 111. In the AF processing circuit 109, receiving the inputted digital image signals, the high-frequency components of a frame size of image data are extracted through a high-pass filter (HPF) or the like, and calculation processing such as accumulative addition is performed thereon. By this, the AF evaluation value corresponding to the contour component amount of the high-frequency side and the like is calculated, and AF control by the contrast detection method can be performed. The AF evaluation value is inputted into the camera controller 111 as an indicator of the focusing state of the image-taking optical system.

As described above, the present camera system is a system provided with a hybrid AF having two kinds of focus detection units one of which uses the phase difference detection method and the other of which uses the contrast detection method.

In the camera system of the present embodiment, the camera controller 111 and the lens controller 207 function as an integral controller performing AF control in a cooperative manner. In the AF control, first, the camera controller 111 calculates the defocus amount of the image-taking optical system by the phase difference detection method, and calculates the target driving amount for driving the focusing lens unit 203 to the in-focus position based on the defocus amount and the sensitivity information stored in the storage circuit 210. Then, the camera controller 111 transmits the information on the target driving amount and the driving direction headed toward the in-focus position to the lens controller 207 through the communications circuits 102 and 211. Receiving these pieces of information, the lens controller 207 drives the focusing lens unit 203 toward the in-focus position (position corresponding to the target driving amount). Hereinafter, this will be referred to as a first driving control of the focusing lens unit.

Then, the camera controller 111 performs AF evaluation value calculation by the contrast detection method at an amount, which is slightly short of the predetermined target driving amount (that is, when the remaining driving amount becomes the predetermined amount), and transmits the result of the calculation to the lens controller 207. The lens controller 207 drives the focusing lens unit 203 at a predetermined low speed mentioned later based on the AF evaluation value calculated by the contrast detection method and transmitted from the camera controller 111. In this manner, an in-focus state is obtained. Hereinafter, this will be referred to as a second driving control of the focusing lens unit.

Reference numeral 105 represents a photometry unit which transmits photometry information to the camera controller 111. Since focusing control is performed by varying the charge accumulation time of the image pickup device 108 based on the photometry information, the driving speed of the focusing lens unit 203 based on the contrast detection method is determined by the sensitivity information (image plane movement speed) of the focusing lens unit 203 and the photometry information (the charge accumulation time of the image pickup device 108).

That is, the driving speed (hereinafter, referred to as a predetermined speed) of the focusing lens unit 203 at the time of the second driving control during AF by the contrast detection method is a speed where the focusing lens unit 203 is driven at an image plane speed where the defocus amount calculation and in-focus state determination can be performed in the charge accumulation time of the image pickup device. Normally, this speed is low compared to that at the time of the first driving control during AF by the phase difference detection method.

Reference numeral 107 represents a release switch comprising a two-step switch. At a first-step depression, an SW1 signal starting photometry, focus detection and focusing is outputted, and at a second-step depression, an SW2 signal starting exposure recording by the image pickup device 108 is outputted. The SW1 signal and the SW2 signal are inputted into the camera controller 111.

The camera controller 111 and the lens controller 207 perform AF control of the present camera system. Moreover, the camera controller 111 performs a variety of controls such as communications with the lens controller 207, control of the display unit 112 such as an LCD, control of the input from a setting circuit 113 for setting various operation modes of the camera, checking of the remaining capacity of a power source 110 and distribution of power to the interchangeable lens 200. In the present embodiment, buffer memories for image signals and the like are also included in the camera controller 111.

In film-based single-lens reflex cameras, the film format is fixed, the permissible diameter of the circle of confusion is generally 35 μm, and the stopping accuracy of the focusing lens unit and the like are set in accordance therewith. However, in digital still camera systems like that of the present embodiment, the area of the image pickup device 108 (image plane size) differs among cameras and is not fixed. Moreover, when the pixel pitch (pixel size) of the image pickup device 108 differs among cameras, the permissible diameter of the circle of confusion also differs, so that the required AF accuracy itself differs among cameras. Further, a stopping accuracy of the focusing lens unit higher than that of film-based single-lens reflex cameras is generally required. This is for the following reasons:

(1) the area of the image pickup device is smaller than the taking area of the film; and (2) the output image size can be increased at the camera operator's discretion by the digital still camera.

In the present embodiment, the permissible diameter of circle of confusion corresponding to the pixel pitch is set as 18 μm (corresponding to approximately two pixels in each of the vertical and horizontal directions since one point is expressed by four pixels). This is because even if focus detection and focusing control finer than this are performed, it has no effect on the output image since the point image is within the pixel range. It is to be noted that when the pixel size is small, the accuracy (permissible diameter of circle of confusion) is necessarily increased accordingly.

FIG. 4 shows the focus sensitivity FS in each of the 32 focal length zones stored in the storage circuit 210 in the interchangeable lens 200. The product of the movement amount of the focusing lens unit 203 multiplied by the sensitivity is the actual image plane movement amount, and focusing control is performed based on this image plane movement amount.

Figure 3:
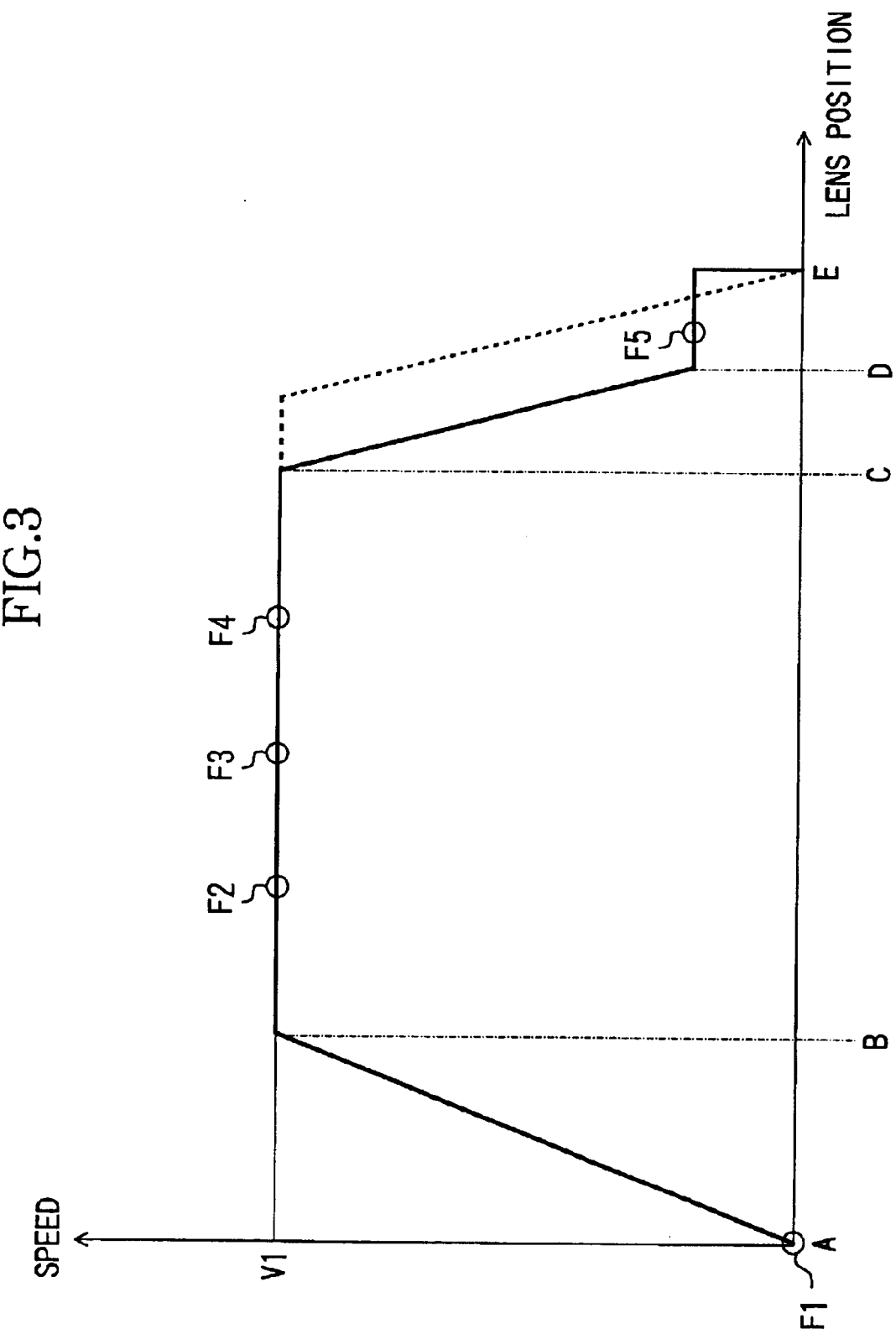
FIG. 3 is a view showing a relationship between the driving speed of the focusing lens and the lens position in the camera system of Embodiment 1.

FIG. 3 shows the actual focusing operation in the present embodiment by a relationship between the movement amount and the speed of the focusing lens unit 203.

First, the focusing lens unit 203 is accelerated toward the position (E in FIG. 3; hereinafter, referred to as target driving position) corresponding to the target driving amount calculated by the first focus detection unit 104 by the phase difference detection method (between A and B). The target driving amount as mentioned here is defined by the number of pulse signals outputted from the focusing lens position sensor 212.

Then, the focusing lens unit 203 is driven at a constant speed with a maximum speed V1 determined by conditions such as the photometry value and the focus sensitivity (between B and C). While the focusing lens unit 203 is being driven at this speed, focus detection by the phase difference detection method is repeated as many times as possible (shown by F2 to F4 in FIG. 3), thereby appropriately correcting the target driving position. This is called an overlap control.

Then, in order that focus detection by the contrast detection method by the AF processing circuit 109 (second focus detection unit) can be started at the point in time when the remaining driving amount to the target driving position becomes a predetermined amount (twenty pulses in the present embodiment), the focusing lens unit 203 is decelerated to the above-mentioned predetermined speed from the position slightly short of the target position (between C and D).

Then, from the position (D), which is 20 pulses short of the target driving position of the focusing lens unit 203 to the target driving position, focus detection by the contrast detection method is performed on the image plane to obtain an in-focus state.

In the conventional camera systems performing hybrid AF by the phase difference detection method and the contrast detection method, after the focusing lens unit is driven to the target driving position and stopped at the position, fine adjustment by the contrast detection method is made. For this reason, there are cases where the lens driving direction is reversed from the former one when the focusing lens is driven by the contrast detection method and this makes the camera operator uncomfortable.

Therefore, in the present embodiment, the frequency with which the driving direction of the focusing lens unit 203 is reversed at the time of switching to the contrast detection method is reduced by switching the focus detection method at the position, which is the predetermined amount short of the target driving position. Moreover, the predetermined amount (20 pulses) is set in a range where the defocus amount can be calculated also by the contrast detection method.

While in the present embodiment, the position D is set as the position, which is 20 pulses short of the target driving amount, the number of pulses short of the target diving amount may be changed according to other conditions.

By the above-described focusing operation, the frequency with which the driving direction of the focusing lens unit 203 is reversed is reduced, and the camera operator is not made to sense discomfort. Moreover, the time required for obtaining an in-focus state can be significantly improved compared to the focusing operation performed all by the contrast detection method. Further, the high AF accuracy by the contrast detection method can be ensured.

Figure 2A:
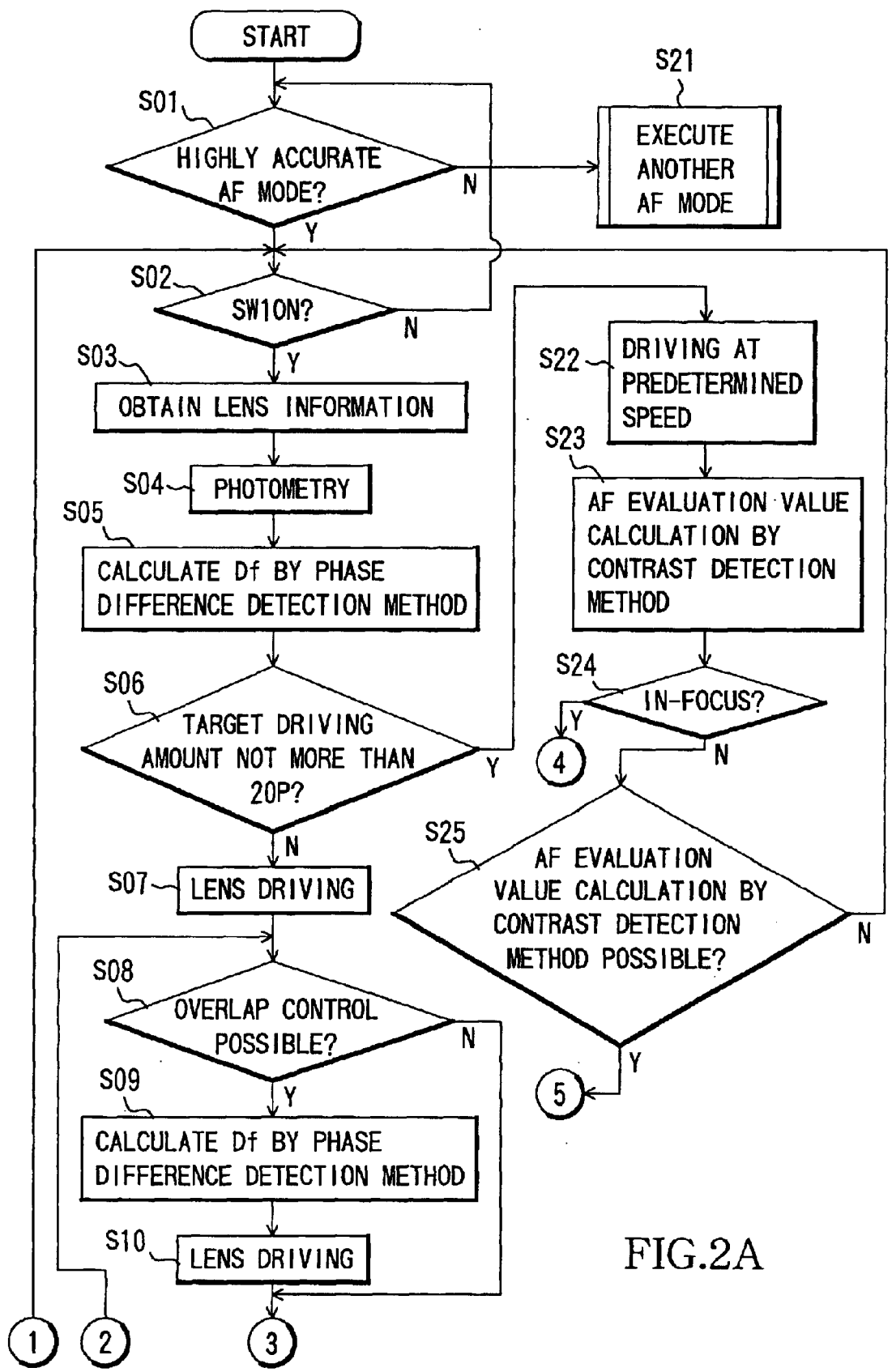
FIGS. 2A through 2B are flowcharts showing the AF operation of the camera system of Embodiment 1.
Figure 2B:
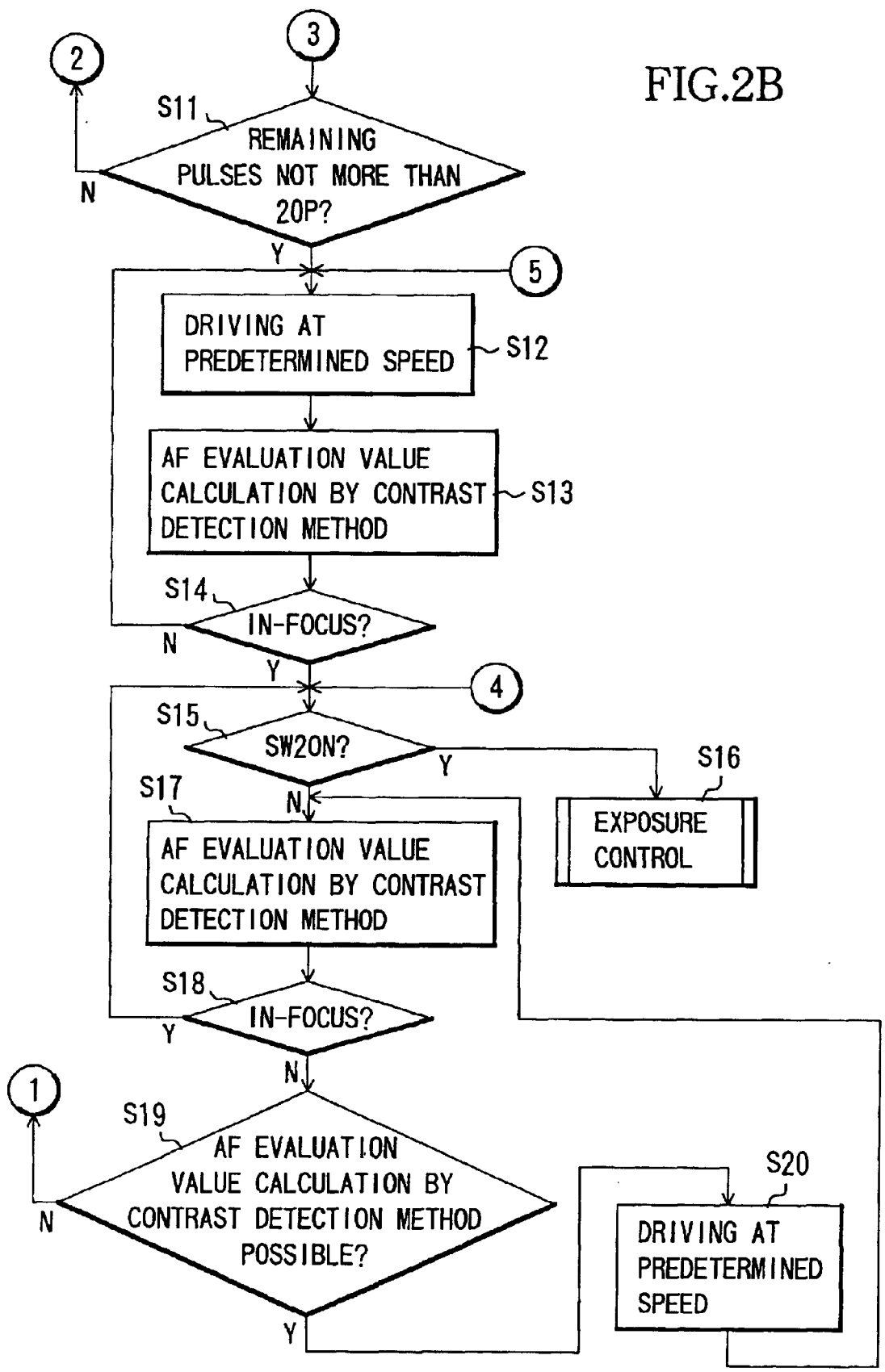

FIGS. 2A and 2B are flowcharts showing the AF operation of the present embodiment, and show mainly the control operations of the camera controller 111 and the lens controller 207. While the operations of the camera controller 111 and the lens controller 207 are shown together in these flowcharts for ease of explanation, they are structured as different programs in actuality. In FIGS. 2A and 2B, the parts marked with the same encircled numbers are related to each other.

At step (abbreviated as S in the figures) 01, the camera controller 111 determines whether or not a highly accurate AF mode in which AF control is performed by using both the phase difference detection method and the contrast detection method is selected by the camera operator in the setting circuit 113 of the camera 100. When the highly accurate AF mode is selected, the process proceeds to step 02. When it is not selected, the process shifts to another AF mode (step 21) and the control of the mode is performed.

At step 02, the camera controller 111 determines whether an ON signal of the SW1 signal (SW1-ON signal) is inputted from the release switch 107 or not. When the SW1-ON signal is not inputted, the process including the determination at step 01 is on standby. When the SW1-ON signal is inputted, the process proceeds to step 03, and the camera controller 111 captures the current position information of the focusing lens unit 203 and the zoom lens unit 202 from the focusing lens position sensor 212 and the focal length sensor 209. The camera controller 111 transmits to the lens controller 207 a command to transmit the focus sensitivity information corresponding to the lens position information, and the lens controller 207 reads out the focus sensitivity information corresponding to the transmission command from among the data stored in the storage circuit 210, and transmits it to the camera controller 111.

At step 04, the camera controller 111 captures the measurement result of the object brightness measured by the photometry unit 105, and sets the shutter speed, the aperture value and the sensitivity (image signal amplification factor) at the time of image-taking based on the photometry result.

At step 05, the camera controller 111 captures a signal from the first focus detection unit 104 having performed focus detection by the phase difference detection method, calculates the defocus amount Df, and calculates the target driving amount (value expressed as the number of pulses) of the focusing lens unit 203 by using the defocus amount and the previously obtained lens position information and focus sensitivity information. The camera controller 111 transmits information representative of the calculated target driving amount to the lens controller 207. Then, the process proceeds to step 06.

At step 06, the lens controller 207 determines whether the received target driving amount is more than 20 pulses (P) or not. When the target driving amount is larger than 20 pulses, the process proceeds to step 07, and when it is not more than 20 pulses, the process proceeds to step 22.

At step 07, the lens controller 207 selects a driving table (prestored in the storage circuit 210) of the focusing lens unit 203 based on the photometry data and the focus sensitivity information, accelerates the focusing lens unit 203 to the maximum speed under that condition (between A and B in FIG. 3), and drives the focusing lens unit 203 at a constant speed, which is the maximum speed to the position which is the difference when the driving amount required for the deceleration to the predetermined speed is subtracted from the position, which is 20 pulses short of the target driving position (between B and C in FIG. 3).

During this constant speed driving, at step 08, the camera controller 111 determines whether overlap control of AF is possible or not (whether the focusing lens unit 203 is being driven at a constant speed or not, whether a driving amount necessary for performing overlap control remains or not, etc.). When overlap control is possible, the process proceeds to step 09, and when it is impossible, the process proceeds to step 11.

The overlap control as mentioned here is to calculate the defocus amount by the phase difference detection method also while the focusing lens unit 203 is being driven and finely adjusts the target driving amount. Since this overlap control of AF is not performed while the focusing lens unit 203 is being accelerated or decelerated, the camera controller 111 determines whether overlap control is possible or not at step 08.

At step 09, the camera controller 111 calculates the defocus amount Df in the overlap control (shown by F2 to F4 in FIG. 3), and newly calculates the target driving amount by use of the focus sensitivity information at this time. Then, the camera controller 111 transmits information on the newly calculated target driving amount to the lens controller 207.

At step 10, based on the target driving amount received at step 09, in order that the focusing lens unit 203 can be driven at the predetermined speed from the position where the remaining driving amount to the target driving amount is the predetermined amount (20 pulses), the lens controller 207 decelerates the focusing lens unit 203 from the position slightly short of the target position (C in FIG. 3) where the remaining driving amount of the focusing lens unit 203 becomes 20 pulses.

At step 11, the lens controller 207 determines whether the remaining driving amount of the focusing lens unit 203 becomes more than 20 pulses or not. When the remaining driving amount is not more than 20 pulses, the process proceeds to step 12, and when it is larger than 20 pulses, the process returns to step 08.

At step 12, the lens controller 207 drives the focusing lens unit 203 at the predetermined speed (between D and E in FIG. 3), and during this time, at step 13, switching to the AF control by the contrast detection method is made. The camera controller 111 performs AF evaluation value calculation (focus detection) by the contrast detection method (shown by F5 in FIG. 3), and transmits a lens driving command based on the result of the calculation to the lens controller 207. The lens controller 207 drives the focusing lens unit 203 in response to the driving command. Thereby, an in-focus state is obtained.

As described above, according to the present embodiment, since switching of the focus detection method (that is, switching from the first driving control to the second driving control of the focusing lens unit 203) can be smoothly made without the focusing lens unit 203 being stopped (with the focusing lens unit 203 being driven), the camera operator does not experience a feeling of discomfort.

In the present embodiment, since switching to the focus detection and the focusing lens driving by the contrast detection method is made when the remaining driving amount to the target driving amount calculated based on the result of the focus detection by the phase difference detection method becomes 20 pulses, the in-focus position at the time of the switching is situated ahead in the driving direction of the focusing lens unit 203. Further, the focusing lens unit 203 is already in the vicinity of the in-focus position at the time of the switching. Therefore, focus detection (AF evaluation value calculation) by the contrast detection method is possible in most cases, and by driving the focusing lens unit 203 based on the AF evaluation value under that condition, a highly accurate in-focus state is obtained.

When the AF evaluation value cannot be accurately calculated such as when the object is low in contrast, an in-focus state can be obtained by driving the focusing lens unit 203 as it is with reference to the AF evaluation value and when the AF evaluation value decreases, returning the focusing lens unit 203 to the position where it is situated before the AF evaluation value decreases.

Then, at step 14, the camera controller 111 determines whether an in-focus state is obtained or not. When an in-focus state is obtained, the process proceeds to step 15, and when it is not obtained, the process proceeds to step 12.

At step S15, the camera controller 111 determines whether an ON signal of the SW2 signal (SW2-ON signal) is inputted from the release switch 107 or not. When the SW2-ON signal is inputted, the process proceeds to step 16, and the camera controller 111 performs exposure control of the image pickup device 18. When the SW2-ON signal is not inputted, the process proceeds to step 17, and the camera controller 111 performs AF evaluation value calculation by the contrast detection method, and again determines whether an in-focus state is obtained or not at step 18. When it is determined that an in-focus state is obtained at this step, the process returns to step 15, and the camera controller 111 determines the state of the SW2 signal.

When it is determined that an in-focus state is not obtained at step 18, the process proceeds to step 19, and the camera controller 111 determines whether the AF evaluation value calculation by the contrast detection method could be performed or not. When the AF evaluation value calculation could be performed, at step 20, the camera controller 111 transmits to the lens controller 207 a command to drive the focusing lens unit 203 at the predetermined speed, and at step 17, performs in-focus state determination while referring to the AF evaluation value. When the defocus amount cannot be calculated at step 19, the process returns to step 02, and the camera controller 111 performs focus detection by the phase difference detection method.

When it is determined that the target driving amount is not more than 20 pulses at step 06, at step 22, the lens controller 207 drives the focusing lens unit 203 at the predetermined speed under the condition at that time similar to step 12. Then, at step 23, the camera controller 111 calculates the AF evaluation value by the contrast detection method similar to step 13, and at step 24, determines whether an in-focus state is obtained or not. When an in-focus state is obtained, the process proceeds to step 15. When it is determined that an in-focus state is not obtained, the process proceeds to step 25, and the camera controller 111 determines whether the AF evaluation value calculation by the contrast detection method could be performed or not similar to step 19. When the AF evaluation value calculation could be performed, the process proceeds to step 12. When the AF evaluation value calculation cannot be performed, the process returns to step 02.

By carrying out the control as described above, highly accurate automatic focusing control can be performed while the time required for obtaining an in-focus state is shortened.

(Embodiment 2)

Figure 5:
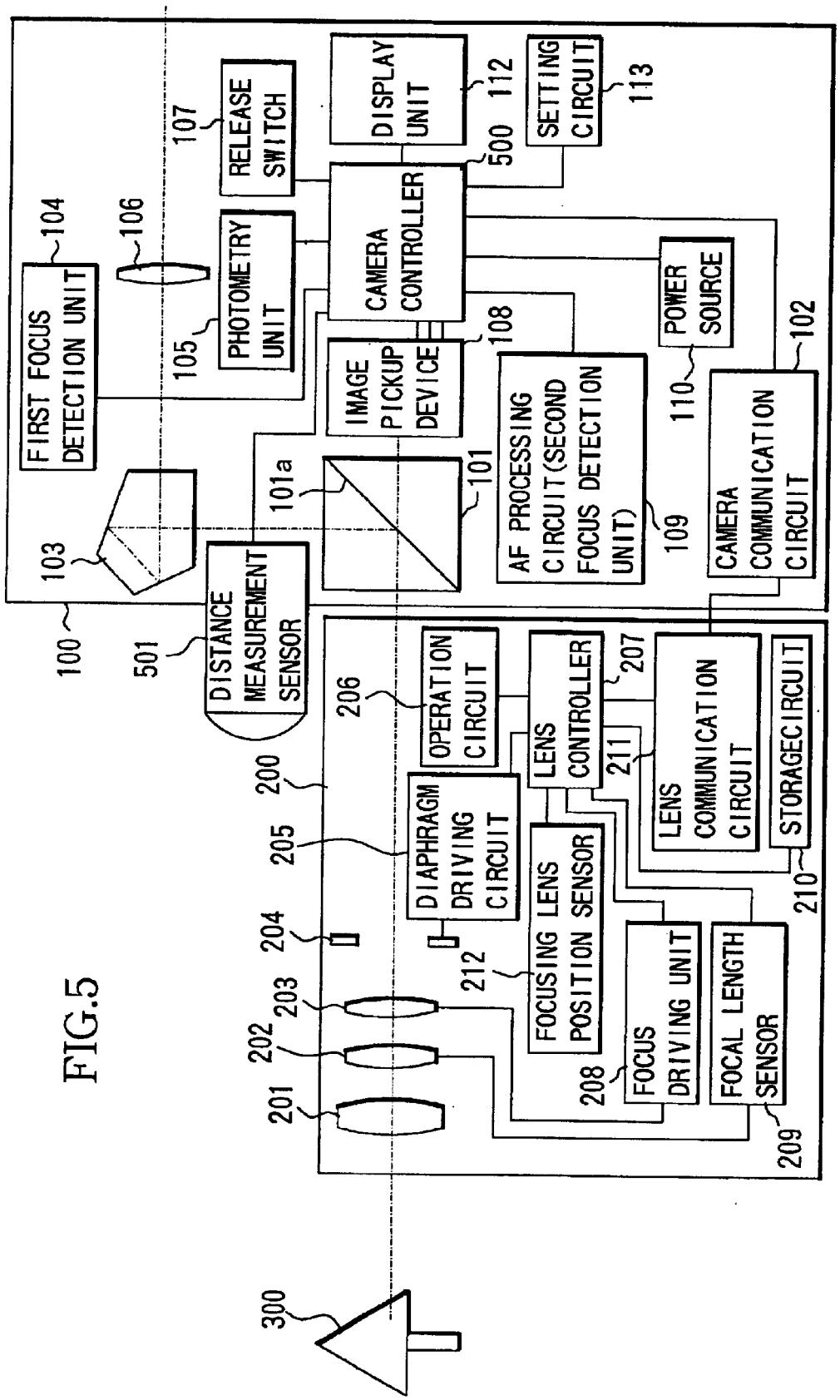
FIG. 5 is a block diagram showing the structure of a camera system according to Embodiment 2 of the present invention.

FIG. 5 shows the structure of a lens interchangeable camera system according to Embodiment 2 of the present invention. In the present embodiment, elements common to those of Embodiment 1 are denoted by the same reference numerals, and descriptions thereof are omitted.

In the present embodiment, instead of the first focus detection unit 104 using the phase difference detection method according to Embodiment 1, a distance measurement sensor 501 as a first focus detection unit using the active method is provided. This first focus detection unit emits infrared light to the object 300 by use of an infrared-emitting diode (IrLED), and receives the infrared light reflected at the object 300 by a light receiving element. The camera controller 111 obtains the distance to the object 300 from the output of the light receiving element, and calculates the position of the focusing lens unit 203 where in-focus state is obtained with respect to the object 300 at the obtained distance (or reads out the position of the focusing lens unit 203 with respect to the object distance, from table data prestored in a memory). Then, the camera controller 111 compares the position of the focusing lens unit 203 obtained from the focusing lens position sensor 212 with the position of the focusing lens unit 203 where an in-focus state is obtained, that is, detects the focusing state of the image-taking optical system, and calculates the target driving amount of the focusing lens unit 203.

In the present embodiment, first, the focusing lens unit 203 is accelerated toward the position (target driving position) corresponding to the target driving amount calculated based on the result of the detection by the first focus detection unit using the active method, and the focusing lens unit 203 is driven at a constant speed (maximum speed) determined by conditions such as the photometry value and the focus sensitivity. While the focusing lens unit 203 is being driven at this speed, focus detection by the active method is repeated as many times as possible, thereby appropriately correcting the target driving amount.

Then, in order that the focusing lens unit 203 can be driven at the above-mentioned predetermined speed from the point where the remaining driving amount to the target driving amount becomes the predetermined amount (20 pulses in the present embodiment), the focusing lens unit 203 is decelerated from the position slightly short of the target position where the remaining driving amount becomes the predetermined amount. Then, when the remaining driving amount is not more than the predetermined amount, the focusing lens unit 203 is driven based on the result of the detection by the second focus detection unit using the contrast detection method, thereby obtaining a highly accurate in-focus state.

By carrying out the control as described above, the focus detection method can be smoothly switched without the focusing lens unit 203 being stopped (with the focusing lens unit 203 being driven), so that the camera operator is not made to experience discomfort. Moreover, highly accurate automatic focusing control can be performed while the time required for obtaining an in-focus state is shortened.

While in the above-described two embodiments, the focus detection method is switched when the remaining driving amount to the target driving amount becomes the predetermined amount, it may be performed to directly detect the position of the focusing lens unit 203 and switch the focus detection method when the detected position reaches the position where the remaining driving amount becomes the predetermined amount. While the predetermined amount as mentioned here is the number of pulses in the present embodiments, it may be changed according to the f-number and the focal length of the optical system and the permissible diameter of the circle of confusion of the camera.

Moreover, the driving speed of the focusing lens unit 203 in performing focus detection by the second focus detection unit may be changed according to conditions such as the driving load of the focusing lens unit 203 and the temperature.

Moreover, the numerical values described in the present embodiments may be changed. Further, while cases where the phase difference detection method and the contract detection method are combined and the active method and the contrast detection method are combined as the focus detection method are described, another method (for example, a passive method) may be combined.

(Embodiment 3)

While lens interchangeable camera systems are described in the above-described embodiments, the present invention is applicable a camera which has a lens apparatus integrally.

Figure 6:
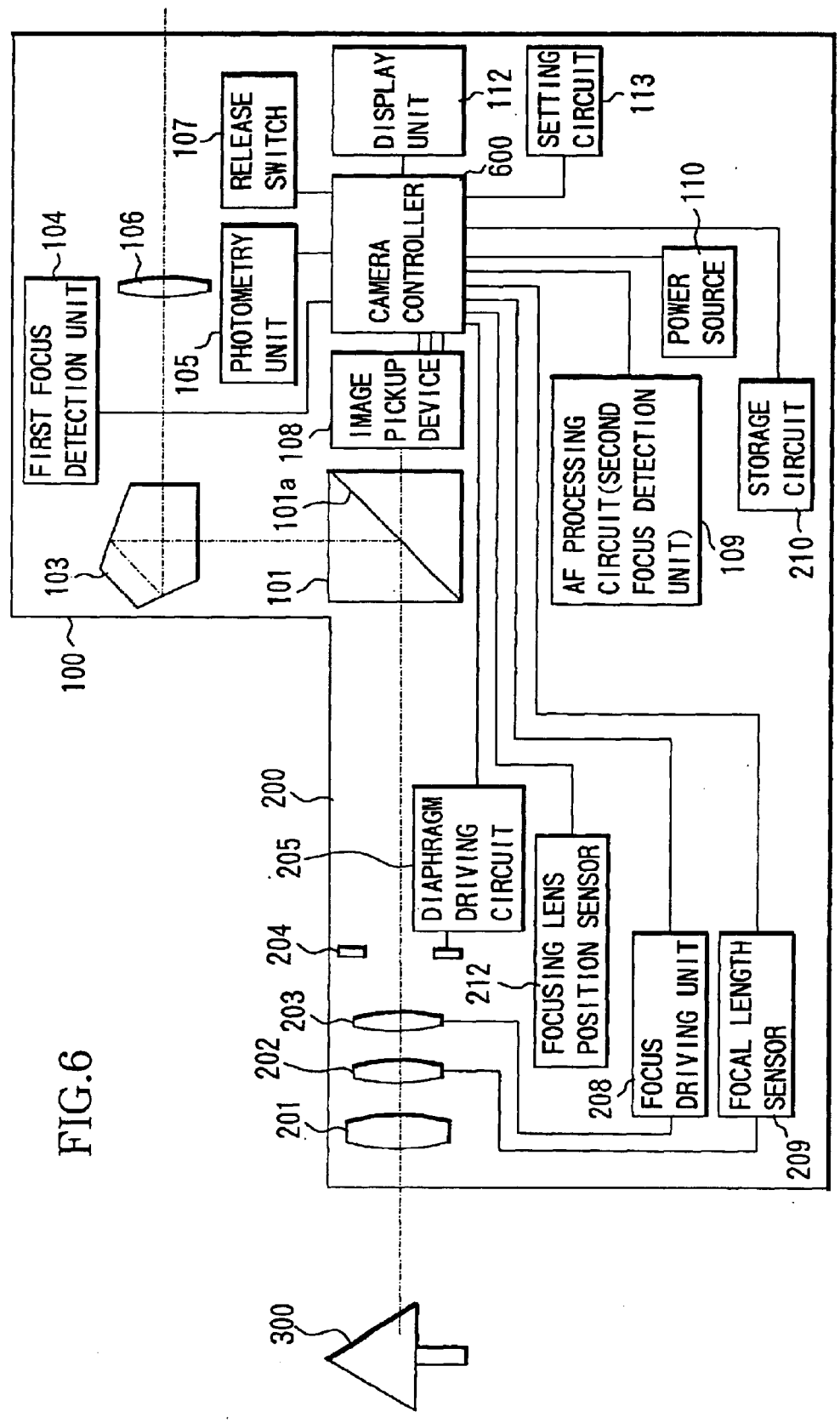
FIG. 6 is a block diagram showing the structure of a camera which has a lens apparatus integrally according to Embodiment 3 of the present invention.

FIG. 6 shows the structure of a lens-incorporating camera according to Embodiment 3 of the present invention. The camera of the present embodiment performs AF control similar to that of Embodiment 1. In FIG. 6, elements common to those of Embodiment 1 or 2 are denoted by the same reference numerals, and descriptions thereof are omitted.

A camera controller 600 has both of the functions of the camera controller and the lens controller in Embodiment 1 or 2, and executes the part of the flowcharts of FIGS. 2A and 2B except the part of communications between the camera and the lens to perform AF control.

As described above, according to the above-described embodiments, the behavior of the focusing lens is stabilized, and automatic focusing control can be performed without the camera operator being made to experience discomfort. Further, the time required for obtaining an in-focus state can be shortened and focusing accuracy can be enhanced.

By performing the driving of the focusing lens (unit) by the second driving control at a constant speed lower than the maximum speed of the focusing lens in the first driving control, driving of the focusing lens suitable for the in-focus detection by the second focus detection unit can be performed, so that the time required for obtaining an in-focus state can be further shortened.

While preferred embodiments have been described, it is to be understood that modification and variation of the present invention may be made without departing from scope of the following claims.

What is claimed is:

1. A camera system which comprises: a lens apparatus which is provided with a image-taking optical system including a focusing lens; and a camera on which the lens apparatus is mounted, comprising:
   a first focus detection unit and a second focus detection unit which detect a focusing state of the image-taking optical system by methods different from each other; and
   a controller which controls driving of the focusing lens, the controller obtaining a target driving amount of the focusing lens based on a result of the detection by the first focus detection unit, and performing a first driving control to drive the focusing lens toward a position corresponding to the target driving amount and a second driving control to drive the focusing lens based on a result of the detection by the second focus detection unit,
   wherein the controller switches from the first driving control to the second driving control without stopping the focusing lens when a remaining driving amount to the target driving amount of the focusing lens by the first driving control becomes a predetermined amount.

2. The camera system according to claim 1, wherein the controller performs the second driving control at a second driving speed lower than a first driving speed of the focusing lens in the first driving control.

3. The camera system according to claim 1,
   wherein the controller performs the second driving control when the target driving amount of the focusing lens calculated based on the result of the detection by the first focus detection unit is equal to or less than the predetermined amount.

4. The camera system according to claim 1,
   wherein the first focus detection unit detects the focusing state of the image-taking optical system by a phase difference detection method or an active method, and the second focus detection unit detects the focusing state of the image-taking optical system by a contrast detection method.

5. A camera comprising:
   a first focus detection unit and a second focus detection unit which detect a focusing state of a image-taking optical system including a focusing lens, by methods different from each other; and
   a controller which controls driving of the focusing lens, the controller obtaining a target driving amount of the focusing lens based on a result of the detection by the first focus detection unit, arid performing a first driving control to drive the focusing lens toward a position corresponding to the target driving amount and a second driving control to drive the focusing lens based on a result of the detection by the second focus detection unit;
   wherein the controller switches from the first driving control to the second driving control without stopping the focusing lens when a remaining driving amount to the target driving amount of the focusing lens by the first driving control becomes a predetermined amount.

6. The camera according to claim 5,
   wherein the controller performs the second driving control at a second driving speed lower than a first driving speed of the focusing lens in the first driving control.

7. The camera according to claim 5,
   wherein the controller performs the second driving control when the target driving amount of the focusing lens calculated based on the result of the detection by the first focus detection unit is equal to or less than the predetermined amount.

8. The camera according to claim 5,
   wherein the first focus detection unit detects the focusing state of the image-taking optical system by a phase difference detection method or an active method, and the second focus detection unit detects the focusing state of the image-taking optical system by a contrast detection method.

9. The camera according to claim 5, wherein the image-taking optical system is integrally provided.

10. The camera according to claim 5, wherein a lens apparatus which includes the image-taking optical system can be attachable.

11. A lens apparatus which can be attachable to a camera comprising a first focus detection unit and a second focus detection unit which detect a focusing state of a image-taking optical system by methods different from each other, comprising:
    the image-taking optical system which includes a focusing lens; and
    a controller which controls driving of the focusing lens based on information obtained from the camera, the controller performing a first driving control to drive the focusing lens toward a position corresponding to a target driving amount of the focusing lens obtained in the camera based on a result of the detection by the first focus detection unit and a second driving control to drive the focusing lens based on a result of the detection by the second focus detection unit;
    wherein the controller switches from the first driving control to the second driving control without stopping the focusing lens when a remaining driving amount to the target driving amount of the focusing lens by the first driving control becomes a predetermined amount.

12. The lens apparatus according to claim 11,
    wherein the controller performs the second driving control at a second driving speed lower than a first driving speed of the focusing lens in the first driving control.

13. The lens apparatus according to claim 11,
    wherein the controller performs the second driving control when the target driving amount of the focusing lens calculated based on the result of the detection by the first focus detection unit is equal to or less than the predetermined amount.

14. The lens apparatus according to claim 11,
    wherein the lens apparatus is attachable to a camera which comprises the first focus detection unit which detects the focusing state of the image-taking optical system by a phase difference detection method or an active method and the second focus detection unit which detects the focusing state of the image-taking optical system by a contrast detection method.

15. A camera system which comprises: a lens apparatus which is provided with an image-taking optical system including a focusing lens; and a camera on which the lens apparatus is mounted, comprising:
   a first focus detection unit and a second focus detection unit which detect a focusing state of the image-taking optical system by methods different from each other; and
   a controller which controls driving of the first focusing lens, the controller performing a first driving control to drive the focusing lens based on a result of the detection by the first focus detection unit and a second driving control to drive the focusing lens based on a result of the detection by the second focus detection unit,
   wherein the controller switches from the first driving control to the second driving control without stopping the focusing lens after driving the focusing lens by a predetermined amount through the first driving control.

16. A camera on which a lens apparatus including an image-taking optical system is mounted, said camera comprising:
   a first focus detection unit and a second focus detection unit which detect a focusing state of the image-taking optical system by methods different from each other; and
   a controller which controls driving of a focusing lens in the image-taking optical system, the controller performing a first driving control to drive the focusing lens based on a result of the first focus detection unit and a second driving control to drive the focusing lens based on a result of the detection by the second focus detection unit;
   wherein the controller switches from the first driving control to the second driving control without stopping the focusing lens after driving the focusing lens by a predetermined amount through the first driving control.

17. A lens apparatus which can be attachable to a camera comprising a first focus detection unit and a second focus detection unit which detect a focusing state of an image-taking optical system by methods different from each other, comprising:
   the image-taking optical system which includes a focusing lens; and
   a controller which performs a first driving control to drive the focusing lens based on a result of the detection by the first focus detection unit and a second driving control to drive the focusing lens based on a result of the detection by the second focus detection unit,
   wherein the controller switches from the first driving control to the second driving control without stopping the focusing lens after driving the focusing lens by a predetermined amount through the first driving control.

18. A camera system which comprises: a lens apparatus which is provided with an image-taking optical system including a focusing lens; and a camera on which the lens apparatus is mounted, comprising:
   a first focus detection unit and a second focus detection unit which detect a focusing state of the image-taking optical system by methods different from each other; and
   a controller which controls driving of the focusing lens, the controller obtaining a target driving amount of the focusing lens based on a result of the detection by the first focus detection unit, and performing a first driving control to drive the focusing lens toward a position corresponding to the target driving amount and a second driving control to drive the focusing lens based on a result of the detection by the second focus detection unit,
   wherein the controller switches from the first driving control to the second driving control without stopping the focusing lens.

19. A camera comprising:
   a first focus detection unit and a second focus detection unit which detect a focusing state of a image-taking optical system including a focusing lens, by methods different from each other; and
   a controller which controls driving of the focusing lens, the controller obtaining a target driving amount of the focusing lens based on a result of the detection by the first focus detection unit, and performing a first driving control to drive the focusing lens toward a position corresponding to the target driving amount and a second driving control to drive the focusing lens based on a result of the detection by the second focus detection unit;
   wherein the controller switches from the first driving control to the second driving control without stopping the focusing lens.

20. A lens apparatus which can be attachable to a camera comprising a first focus detection unit and a second focus detection unit which detect a focusing state of a image-taking optical system by methods different from each other, comprising:
   the image-taking optical system which includes a focusing lens; and
   a controller which controls driving of the focusing lens based on information obtained from the camera, the controller performing a first driving control to drive the focusing lens toward a position corresponding to a target driving amount of the focus detection unit and a second driving control to drive the focusing lens based on a result of the detection by the second focus detection unit;
   wherein the controller switches from the first driving control to the second driving control without stopping the focusing lens.

* * * * *